United States Patent
Heiderman

(10) Patent No.: US 6,959,724 B2
(45) Date of Patent: Nov. 1, 2005

(54) MULTIPLE REGULATOR VACUUM DELIVERY VALVE ASSEMBLY

(75) Inventor: Douglas Charles Heiderman, Akron, NY (US)

(73) Assignee: Praxair Technology, Inc., Danbury, CT (US)

( * ) Notice: Subject to any disclaimer, the term of this patent is extended or adjusted under 35 U.S.C. 154(b) by 130 days.

(21) Appl. No.: 10/184,987

(22) Filed: Jul. 1, 2002

(65) Prior Publication Data

US 2004/0000338 A1 Jan. 1, 2004

(51) Int. Cl.⁷ .................................................. F16K 7/00
(52) U.S. Cl. ...................... 137/494; 137/592; 137/613
(58) Field of Search ................................. 137/592, 614, 137/613, 494

(56) References Cited

U.S. PATENT DOCUMENTS

| 1,883,690 A | * | 10/1932 | Gilgenberg ............ 137/505.12 |
| 2,294,163 A | * | 8/1942 | Donnelly et al. ......... 122/14.31 |
| 6,045,115 A | * | 4/2000 | Martin et al. ................ 251/118 |

* cited by examiner

Primary Examiner—Stephen M. Hepperle
(74) Attorney, Agent, or Firm—Iurie A. Schwartz

(57) ABSTRACT

This invention is directed to an apparatus for controlling the discharge of pressurized fluids from the outlet of a pressurized vessel, and particularly directed to multiple fluid regulating devices within the vessel for storing and controlling the flow of fluid or gases out of the vessel.

19 Claims, 2 Drawing Sheets

MULTIPLE REGULATOR VACUUM DELIVERY VALVE ASSEMBLY

FIELD OF THE INVENTION

This invention relates to a valve assembly for storing and dispensing fluids, and more particularly, this invention relates to a multiple regulator vacuum delivery valve assembly for storing and dispensing pressurized gases, and which prevents uncontrolled discharge of the pressurized gases from a vessel.

BACKGROUND OF THE INVENTION

It has been a goal in the industry to provide a safe and effective way to handle toxic, flammable, corrosive gases at sub-atmospheric conditions. In particular, these gases include dopant gases. Generally, dopant gases are stored in compressed gas cylinders at pressures equal to the individual gases vapor pressure at a given or at a specific pressure depending upon the properties of the specific gas. The gases serve as a source of dopant material for the manufacturing of semiconductor devices. These dopant gases are used in a tool called an ion implanter. Ion implanters are located within in the fabrication area of a semiconductor production facility where several hundreds or even thousands of personnel are engaged in the semiconductor manufacturing process. These tools are operated at very high voltages, typically up to several thousand kilovolts. Due to these high voltages, the dopant source gases must be located at or within the tool itself (most other semiconductor tools locate source gases outside of the personnel or main production area). One distinct characteristic of the ion implant tools is that they operate as sub-atmospheric pressure. Utilization of the vacuum present at the tool to delivery product from the cylinder creates a safer package in that product cannot be removed from the cylinder package until a vacuum is applied. This vacuum delivery concept prevents accidental exposure from the pressurized gas.

Currently, there are believed to be three distinct methods for solving the problems associated with the sub-atmospheric delivery of dopant gases. The first involves filling a compressed gas cylinder with a physical adsorbent material (beaded activated carbon), and reversibly adsorbing the dopant gases onto the material. This concept is commonly known as the SDS™ technology. The desorption process involves applying a vacuum or heat to the adsorbent material/cylinder. In practice, vacuum from the ion implanter is used to desorb the gas from the solid-phase adsorbent. There are certain limitations associated with the problems with the SDS technology, and they include: 1) the adsorbent material has a finite loading capacity thereby limiting the amount of product available in a given size cylinder; 2) the desorption process can be initiated by exposing the cylinder package to heat, thereby causing the cylinders to reach and deliver gases at atmospheric and super-atmospheric pressures when the cylinder is exposed to temperatures greater than 70 degrees F., which are common in many cylinder warehouse locations; 3) the purity of the gas delivered from the cylinder can be comprised due to adsorption/desorption of the other materials/gases on the adsorbent material; and 4) adsorbent attrition can lead to particulate contamination in the gas delivery system.

A second method for solving the problems associated with the sub-atmospheric delivery of dopant gases involves the use of a mechanical regulator or check valve to control/deliver the product sub-atmospherically. These regulating devices are set to deliver or open when sub-atmospheric or vacuum conditions are applied to the device. The regulating devices are located upstream of a conventional on/off cylinder valve seat mechanism. The exact location of these upstream regulating devices can be in the valve body, in the neck cavity, inside the cylinder itself, or combinations of all three locations. In each case the regulating device is located upstream of the cylinder valve seat with respect to flow of gas from the interior of the cylinder to the delivery port.

U.S. Pat. No. 5,937,895 discloses a regulator in the form of dispensing check valve and a flow restriction arrangement to provide a virtually fail safe system for preventing hazardous discharge of fluid from a pressurized cylinder or tank. U.S. Pat. No. 6,045,115 discloses a flow restrictor to provide a capillary size opening that minimizes any discharge of toxic gases from compressed gas cylinders in the unlikely event of the control valve or regulator failure. Both of these disclosures provide for a sub-atmospheric delivery regulating device that is located upstream of a valve seat with regard to the flow of gas through a valve. It is believed that these disclosures provide a regulating device with significant limitations regarding the maximum inlet pressure (or cylinder storage pressure) must be at or below approximately 600 psig, and the regulating device is preset for a given pressure (which is not adjustable).

U.S. Pat. Nos. 6,089,027 and 6,101,816 are both related to a fluid storage and dispensing system comprising a vessel for holding a desired pressure. The vessel has a pressure regulator, e.g., a single-stage or multi-stage regulator, associated with a port of the vessel, and set at a predetermined pressure. A dispensing assembly, e.g., including a flow control means such as a valve, is arranged in gas/vapor flow communication with the regulator, whereby the opening of the valve effects dispensing of gas/vapor from the vessel. The fluid in the vessel may be constituted by a liquid that is confined in the vessel at a pressure in excess of its liquefaction pressure at prevailing temperature conditions, e.g., ambient (room) temperature. The '027 patent discloses a multi-stage regulator on the upstream side of the valve control means.

The above patents disclose locating the regulating devices upstream of the valve seat with respect to the flow of gas from the interior of the cylinder to the delivery port. However, the regulating devices can be located in the valve body, in the neck cavity, inside the cylinder itself, or a combination of all three of these locations.

A third method for solving the problems associated with the sub-atmospheric delivery of dopant gases involves the use of a single regulator located downstream mechanical regulator or check valve to control/deliver the product sub-atmospherically. U.S. Pat. No. 6,314,986 discloses a modular gas control device for use with a compressed gas cylinder comprises a primary module and a secondary module mounted on the primary module. This patent discloses the use of a single regulator located downstream of the main cylinder shut-off valve. The regulator is located within the valve body and is adjustable to deliver any desired outlet pressure from sub- to super-atmospheric pressure. The shut-off valve has its internal and seat mechanism located upstream of the regulator. A single regulator is disclosed. There are certain potential problems associated with this method. For example, potential high leak rate and pressure rise in the event the regulator failure may occur. Also, the single regulator may have difficulty controlling flow over large inlet pressure ranges.

It is an object of this invention to limit or prevent the release of toxic gases in the event of a valve or conduit failure.

Another object of this invention is to enable the storage of higher pressures in the gas cylinders. The higher pressure provides a greater amount of product to be contained in the cylinder, thereby providing greater productivity and lower cost for the customer.

Another object is to provide greater protection from exposing the cylinder valve seat to air contamination by the additional regulator(s).

Yet another object is to provide a pressurized gas cylinder even greater protection from exposing the pressurized gas to the atmosphere due to the limited flow capacity of the specialized capillaries.

Yet another object is to provide a regulating device downstream of the valve seat with an optional control to adjust the outlet pressure from sub-atmospheric to any desirable pressure less than or equal to the outlet pressure of the regulator located upstream of the valve seat.

SUMMARY OF THE INVENTION

This invention is directed to an apparatus for controlling the discharge of pressurized fluids from the outlet of a pressurized vessel, the apparatus comprising: a) a port body for communication with the outlet of a pressurized tank defining a fluid discharge path; b) a valve element fixed in or upstream of the port body and adapted for movement between a sealing position that blocks fluid flow through the fluid discharge path and an open position that permits fluid flow along the fluid discharge path; c) an upstream diaphragm defining an interior volume isolated from the pressure condition upstream of the valve element and engaged with the valve element to control the movement of the valve element in a manner that retains the valve element in the sealing position until a pressure differential between the interior volume of the diaphragm and the interior of the port body moves the valve element to the open position; and d) a downstream diaphragm defining an interior volume isolated from the pressure condition downstream of the valve element and engaged with the valve element to control the movement of the valve element in a manner that retains the valve element in the sealing position until a pressure differential between the interior volume of the diaphragm and the interior of the port body moves the valve element to the open position.

In another embodiment, this invention is directed to a cylinder and a valve assembly for containing pressurized fluid and controlling the discharge of pressurized fluid from the cylinder, the cylinder and valve assembly comprising: a) a cylinder defining a cylinder opening; b) a port body adapted for sealing engagement with the cylinder opening; c) a fluid inlet port defined by the port body and located outside the cylinder; d) a fluid discharge path defined by the valve body between the fluid inlet port and the fluid outlet port; e) a manually operated shut off valve for controlling fluid flow along the fluid discharge path; and f) an automatic valve containing a valve element biased into a sealing position that blocks fluid flow along the fluid discharge path and a plurality of sealed bellows, at least one located upstream and at least one located downstream of the valve element along the fluid discharge path, the sealed bellows having one portion operably linked to the valve element to move the valve element to an open position when relative pressure between the interior and exterior of the bellow expands the bellows and wherein the open position permits fluid flow along the fluid discharge path.

In yet another embodiment, this invention is directed to an apparatus for controlling the discharge of pressurized fluids form the outlet of a pressurized tank containing toxic hydridic or halidic compounds, the apparatus comprising: a) a container for holding a pressurized fluid in an at least partial gas phase; b) an outlet port for releasing pressurized gas from the container; c) a gas flow path defined at least in part by the outlet port for delivering pressurized gas from the container; and d) a plurality of separate regulating devices at least one upstream and at least one downstream of a valve in the form of a restricted flow path along at least a portion of the gas flow path that limits the flow of the gas contained in the container to between 10 to 20 sccm at atmospheric conditions.

In this invention, the vessel or port body retains a manually activated valve in addition to the valve element. A packing in the conduit with a restricted flow path defines a portion of the fluid discharge path. This conduit comprises a capillary tube having an internal diameter that does not exceed 0.2 mm. The diaphragm comprises a bellows.

The housing defines a bellow chamber that houses the bellows, the bellows chamber communicates with a portion of the fluid discharge path located downstream of the poppet/valve element, and the bellows is sealed with sufficient interior pressure to move the poppet/valve element to the open position when communication with the discharge path produces a sufficient pressure condition within the bellows chamber. The popper/valve element comprises a poppet and expansion of the bellows causes the pin to displace the poppet to an open position. One sealed bellows is located upstream and one bellows located downstream of the cylinder valve, each bellows is adapted to move its poppet/valve element to an open position in response to a pressure condition in the bellows chamber. The restricted passage is a capillary tube containing packing that defines the fluid inlet port and locates the fluid inlet port about midway along the length of the cylinder along the length of the fluid discharge path.

Additional objects, embodiments, advantages and details of the invention are described in the following detailed description of the preferred embodiments.

DETAILED DESCRIPTION OF THE PREFERRED EMBODIMENTS

The present invention relates to a multiple regulating/switching devices (i.e., regulator) within the vacuum delivery package system. The first regulating device is located upstream of the flow control element (i.e., valve seat). The first device delivers gas from interior of the cylinder at a reduced pressure. For example, the cylinder pressure may be in the range of from about 0 to about 1800 psig, while the outlet pressure from this first regulating device may be in the range of from about 0 to about 200 psig, preferably closer to the about 0 psig range.

A major aspect of this invention is the utilization of a second regulating/switching device (regulator/check valve)

located downstream of the cylinder valve but within the valve body. This second regulating device is designed to open (or deliver gas) under sub-atmospheric conditions, i.e. the inlet to the regulating device would be at or above atmospheric pressure and the outlet from the second regulating device would be at sub-atmospheric pressure.

The second regulating device is placed in a position such that it would experience cylinder pressure only when the cylinder valve (or valve seat) is open, thereby limiting the regulating device's exposure to high-pressure gas. Another advantage is that the regulating devices are small enough to fit within the conventional cylinder opening. Yet another advantage is that the location of the second regulator/switching device outside of the cylinder would allow for the regulating device to be adjustable (i.e., the delivery or actuation pressure could be adjusted). This present positioning of the regulating devices, specifically, that one of the regulating devices is located upstream of the cylinder valve seat while a second regulating device is located downstream of the cylinder valve seat, results in the advantageous embodiment of this invention. More specifically, the location of the second regulating device downstream of the cylinder valve is integral to the cylinder valve in that the regulating device is permanently attached or is actually part of the cylinder valve (or valve seat) itself.

The multi-regulator system herein is preferably provided in conjunction with capillary flow restrictor assembly. This assembly is preferably located 1) between the first regulating device and the cylinder valve seat or 2) upstream of the first regulating device. The particular application would determine the exact location of the restrictor assembly. The restrictor assembly is designed to limit the flow of gas from the cylinder in the event of a failure of either mechanical device.

Figure 1:
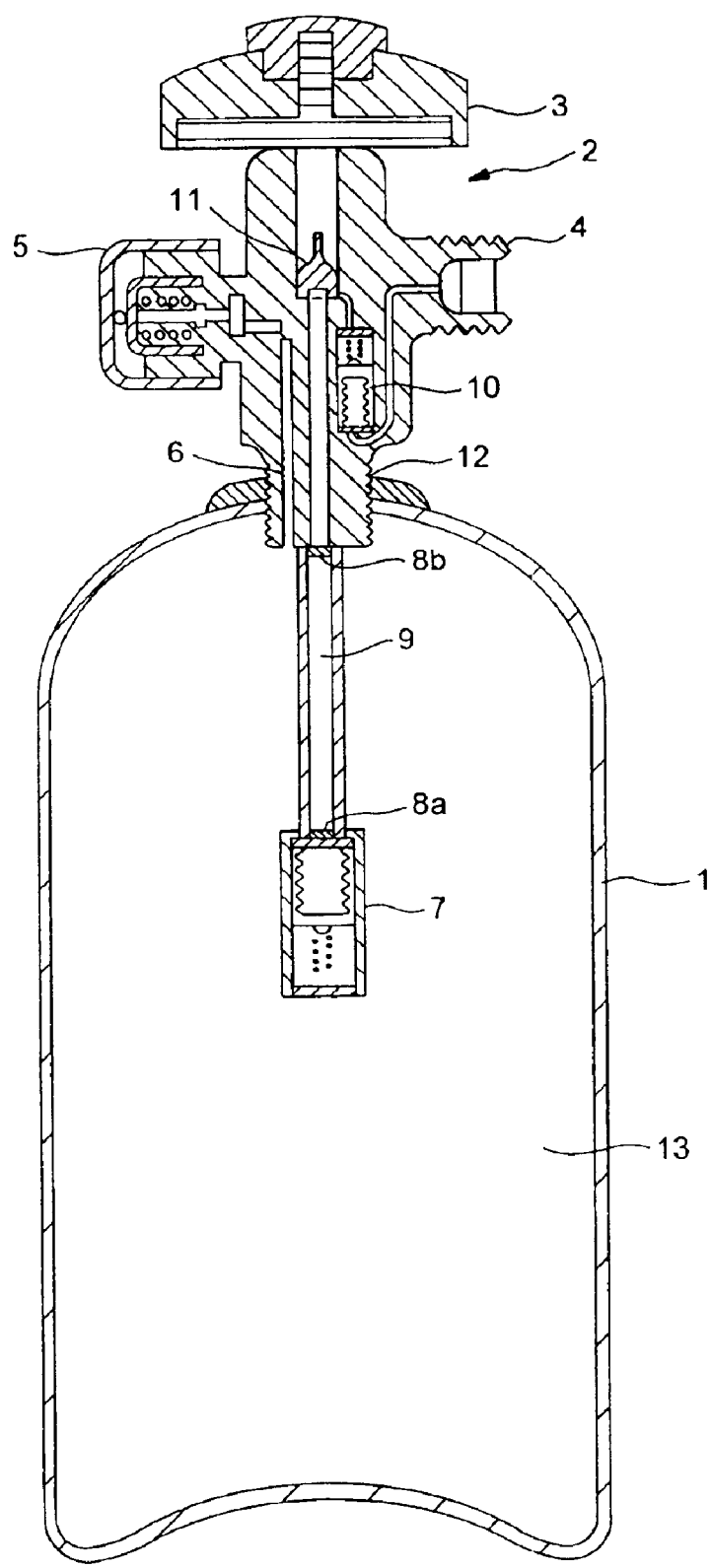
FIG. 1 is a schematic draw cross-sectional view of the cylinder and head valve assembly incorporating the double regulator vacuum delivery valve assembly of this invention.

FIG. 1 provides a preferred embodiment of the present invention, which achieves the objectives of sub-atmospheric delivery using a multiple regulators/switches, at least one upstream of the shut off valve (or cylinder valve seat). This arrangement provides a system that eliminates valve seat (cylinder valve) exposure to air, delivers a constant outlet pressure over the life of the gas in the cylinder (a wide pressure range), and utilizes capillaries restrictors to limit the flow of the fluid to a low preset rate.

As provided in FIG. 1, a multiple regulator vacuum delivery valve assembly 2 with a larger than conventional outlet port body or slightly larger than normal valve body. Cylinder valve seat 11 is located within the valve body and downstream of the regulating device 7. Capillary assembly 9 is located between regulatory device 7 and valve seat 11.

The fluid storage and dispensing systems of a compressed gas cylinder 1 and multiple regulator devices vacuum delivery valve assembly 2. The compressed gas cylinder is filled with the desired fluid 13 (or in particular, dopant gas) to a given pressure or product weight. Cylinder filling, conditioning and product testing takes place through the secondary fill port (not shown but located behind the valve body when referring to FIG. 1). The fill port is opened and closed via a valve mechanism 5 which leads to fluid passage 6. The cylinder valve 11 fixed in or upstream of customer use port 4 is opened/closed via a manually operated valve 3 to allow fluid flow through the discharge path. Flow of gas is accomplished by applying a vacuum to the outlet port 4, which expands the bellows in the second regulating device 10 thereby moving the poppet/valve element in device 10 from its seat and allowing gas to flow from the interior of cylinder 1 through the first regulating device 7, through the capillaries 9 and around the open valve seat 11. First regulator device 7 is preset to deliver gaseous products to second regulator device 10 at a reduced pressure with relation to the pressure inside the cylinder 13. The second regulator device 10 provides vacuum delivery of the lower pressure gas from first regulating device 7 to the outlet port for use by the semiconductor tool. 8A and 8B are frit filter devices.

Figure 2A:
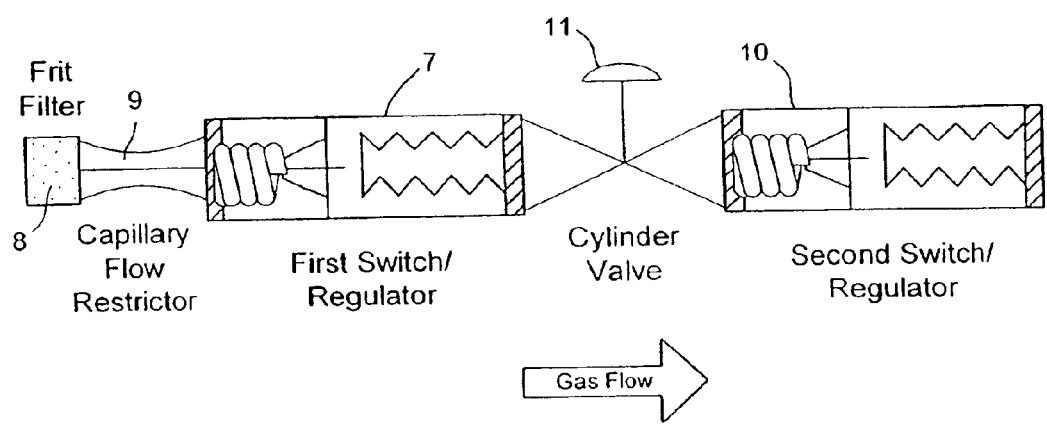
FIG. 2A is a schematic diagram of the alternative the capillary flow restrictor is disposed upstream of the first regulating/switching device.
Figure 2B:
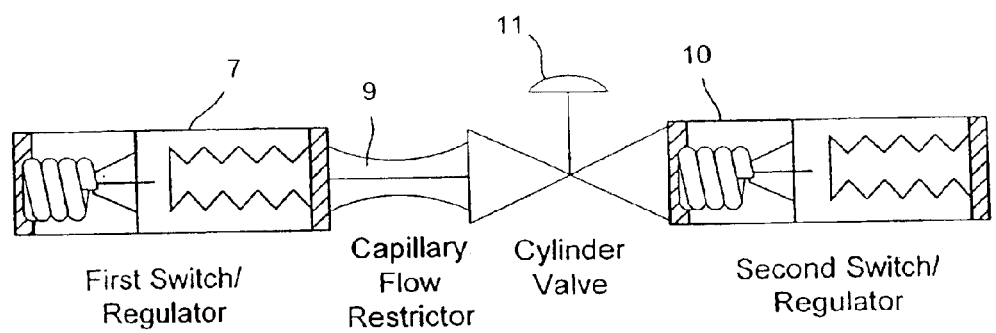
FIG. 2B is a schematic diagram of an alternative embodiment, where the capillary flow restrictor is disposed downstream of the first regulating/switching device.

FIG. 2 provides a schematic diagram of the arrangement of the regulator devices relative to the capillary assembly and the cylinder valve seat. In one embodiment, the capillary flow restrictor 9 is positioned upstream of regulator 7. Fluid passes downstream to cylinder valve 11 and then to downstream regulator device 10. In another embodiment, the upstream regulator device is positioned upstream of capillary flow restrictor 9, then the fluid passes on to cylinder valve 11 prior to downstream regulator device 10.

Various elements and their operations not specifically discussed herein, including but not limited to the operations of the regulating devices and the capillary flow restrictors, may be found in U.S. Pat. Nos. 5,937,895; 6,045,115 and 6,007,609, and are incorporated herein by reference.

A key aspect to this invention is the location of the regulating/switching devices, i.e., the first regulator device upstream and the second regulator device downstream of the cylinder valve seat. The type of regulator or check valve can vary depending upon the gas service, delivery pressure, flow rate, etc. The second (vacuum) regulator/check valve must be attached to the valve in a way that provides a gas tight seal, and more preferably be permanently attached to the valve, and more preferably be a located within the casting of the valve body itself. The reason for this location is to protect the regulating device and prevent tampering. The regulating device shall not be limited to vacuum delivery only. The two regulating devices can be pre-set to deliver gas from within the cylinder at any pressure including sub-atmospheric, atmospheric, and super-atmospheric pressure up to the maximum storage pressure of the cylinder. The regulating devices are preferably permanently attached to the cylinder valve body but another embodiment would provide a removable second regulating device that could be threaded or fastened in any other mechanical manner which would provide a gas tight seal. Such a regulating device could be inserted within the body of the outlet port similar to how a reducing flow orifice is installed in outlet ports. Since the second regulator/check valve is located exterior to the cylinder, provisions can be made to allow this regulating device to be adjusted. Adjustment will change the delivery pressure of this regulating device to meet customer requirements. For instance, the regulating device may be adjusted in a manner to change the deliver from sub-atmospheric to atmospheric or super-atmospheric depending upon the customer's needs/application. As mentioned above, for this application the location of the two regulating devices is the critical component for this patent.

The multiple separate regulating devices in this invention facilitate the storage of higher pressures of gases in the vessel. Higher pressure provides greater opportunity to store more product (fluids or gases) in the equal volume, thereby providing lower cost of ownership to the customer. The multiple separate regulating devices provide greater protection to the cylinder valve from air contamination as well as greater safety design should one of the regulating devices fail.

In a separate embodiment, the modifications may also include a single regulating device whereby the regulating device is located at the valve seat and serves as both a regulating device and a valve seat. Another adaptation of the invention involves the use of a single regulating/switching device, which is located downstream of the cylinder valve seat. This regulating device may be part of the cylinder valve body or be adaptable to being inserted into the outlet port as mentioned above. The location of this regulating device would allow for adjustment of the regulating device for delivery of gaseous product over a wide pressure range.

Generally, the vacuum delivery valve assembly in this invention is applicable for a number of gaseous products. Table 1 below includes, but is not limited to, the fluids contemplated in this invention. Other fluids, particularly those including other inert, flammable, toxic or semiconductor process gases are also contemplated in this invention.

TABLE I

| Gas or Fluid | Cylinder Pressure (or Vapor Pressure) in psig | Desired Delivery Pressure in torr | Optional Delivery Pressure in psig |
|---|---|---|---|
| Arsine | 205 | <760 | <205 |
| Boron Trifluoride | 600–1800 | <760 | <600 |
| Phosphine | 583 | <760 | <583 |
| Stibine | 780–1100 | <760 | <1100 |
| Silane | 1100 | <50 psig | <1100 |
| Diborane | 1000 | <760 | <1000 |
| Boron Trichloride | 4.4 | <760 | <4 |
| Halides | 0–1800 | <760 | <1800 |
| Germanium Tetrafluorides | 180 | <760 | <180 |
| Silicon Tetrafluoride | 1000 | <760 | <1000 |

This invention also contemplates the particular use of a specialized shaped cylinder for certain gases or fluids to be stored and dispensed. In particular, the present invention provides for a significantly shorter and wider cylinder when storing and dispensing boron trifluoride.

Those skilled in the art will recognize that numerous changes may be made to the process described in detail herein, without departing in scope or spirit from the present invention as more particularly defined in the claims below.

What is claimed is:

1. An apparatus for controlling the discharge of pressurized fluids from the outlet of a pressurized vessel, the apparatus comprising:
  a. a port body for communication with the outlet of a pressurized tank defining a fluid discharge path;
  b. a cylinder valve fixed in or upstream of the port body and adapted for movement between a sealing position that blocks fluid flow through the fluid discharge path and an open position that permits fluid flow along the fluid discharge path;
  c. a first diaphragm disposed upstream of said cylinder valve, said first diaphragm defining an interior volume isolated from the pressure condition upstream of a first poppet/valve element and engaged with the first poppet/valve element disposed in said first diaphragm to control the movement of the first poppet/valve element in a manner that retains the first poppet/valve element in the sealing position until a pressure differential between the interior and exterior volume of the first diaphragm moves the first poppet/valve element to the open position; and
  d. a second diaphragm disposed downstream of said cylinder valve, said second diaphragm defining an interior volume isolated from the pressure condition upstream of a second poppet/cylinder valve element and engaged with the second poppet/valve element disposed in said second diaphragm to control the movement of the second poppet/valve element in a manner that retains the second poppet/valve element in the sealing position until a pressure differential between the interior and exterior volume of the second diaphragm which is in communication with the port body moves the second poppet/valve element to the open position.

2. The apparatus of claim 1 wherein said port body retains a manually activated valve in communication with said cylinder valve.

3. The apparatus of claim 1 wherein a conduit with a restricted flow path defines a portion of the fluid discharge path.

4. The apparatus of claim 3 wherein a packing in the conduit provides the restricted flow path.

5. The apparatus of claim 3 wherein the conduit comprises a capillary tube having an internal diameter that does not exceed 0.2 mm.

6. The apparatus of claim 1 wherein the diaphragm comprises a bellows.

7. The apparatus of claim 1 wherein a housing defines a bellow chamber that houses the bellows of the upstream diaphragm, the bellows chamber communicates with a portion of the fluid discharge path located downstream of the valve element, and the bellows is sealed with sufficient interior pressure to move the valve element to the open position when communication with the discharge path produces a vacuum condition within the bellows chamber.

8. The apparatus of claim 7 wherein the valve element comprises a poppet valve and expansion of the bellows causes a pin to displace the poppet valve to an open position.

9. A cylinder and a valve assembly for containing pressurized fluid and controlling the discharge of pressurized fluid from the cylinder, the cylinder and valve assembly comprising:
  a cylinder defining a cylinder opening;
  a port body adapted for sealing engagement with the cylinder opening;
  a fluid inlet port defined by the port body and located outside the cylinder;
  a fluid discharge path defined by the valve body between the fluid inlet port and the fluid outlet port;
  a manually operated wheel for controlling fluid flow along the fluid discharge path;
  wherein said manually operated wheel biases a cylinder valve into a scaling position that blocks fluid flow along the fluid discharge path and a plurality of sealed bellows, at least one located upstream and at least one located downstream of the cylinder valve along the fluid discharge path, wherein each sealed bellows has one portion operably linked to a poppet/valve element to move the poppet/valve element to an open position when relative pressure between the interior and exterior of the bellow expands the bellows and wherein the open position permits fluid flow along the fluid discharge path.

10. The apparatus of claim 9 wherein the valve contains one sealed bellows upstream and one sealed bellows downstream of the valve element.

11. The apparatus of claim 9 wherein the port body defines a bellows chamber that houses the bellows.

12. The apparatus of claim 9 wherein the bellows is adapted to move the valve element to an open position in response to a vacuum condition in the bellows chamber.

13. The apparatus of claim 9 wherein the valve element comprises a poppet valve.

14. The apparatus of claim 9 wherein the port body defines a restricted passage along the length of the fluid discharge path.

15. The apparatus of claim 14 wherein the capillary tube defines the fluid inlet port and locates the fluid inlet port about midway along the length of the cylinder.

16. The apparatus of claim 15 wherein the capillary tube retains the inlet tube at about the radial mid point of the cylinder.

17. An apparatus for controlling the discharge of pressurized fluids from the outlet of a pressurized tank containing toxic hydridic or halidic compounds, the apparatus comprising a container for hording a pressurized fluid in an at least partial gas phase;

an outlet port for releasing pressurized gas from the container;

a gas flow path defined at least in part by the outlet port for delivering pressurized gas from the container; and a plurality of separate regulating devices at least one upstream and at least one downstream of a cylinder valve and a restricted flow path configured as a conduit along at least a portion of the gas flow path that limits the flow of the gas through the port body to between 10 to 20 sccm at atmospheric conditions.

18. The apparatus of claim 17 wherein a packing in the conduit provides the restricted flow path.

19. The apparatus of claim 17 wherein the restriction conduit comprises a capillary tube having an internal diameter that does not exceed 0.2 mm.

* * * * *